United States Patent [19]

Azumi

[11] Patent Number: 5,190,897
[45] Date of Patent: Mar. 2, 1993

[54] CERAMIC FOAM FILTERS
[75] Inventor: Shingo Azumi, Toyokawa, Japan
[73] Assignee: Foseco International Limited, Birmingham, England
[21] Appl. No.: 762,256
[22] Filed: Sep. 20, 1991

Related U.S. Application Data

[63] Continuation of Ser. No. 558,154, Jul. 26, 1990, abandoned.

[30] Foreign Application Priority Data

Aug. 8, 1989 [GB] United Kingdom ............... 8918048

[51] Int. Cl.$^5$ .............................................. C04B 38/06
[52] U.S. Cl. ........................................ 501/81; 501/80;
501/89; 501/128; 210/506; 210/510.1
[58] Field of Search ..................... 501/128, 80, 81, 89,
501/82, 88; 210/506, 510.1

[56] References Cited

U.S. PATENT DOCUMENTS

| 4,265,659 | 5/1981 | Blome | 75/93 R |
|---|---|---|---|
| 4,343,704 | 8/1982 | Brockmeyer | 501/80 |
| 4,391,918 | 7/1983 | Brockmeyer | 501/127 |
| 4,713,180 | 12/1987 | Hofmann et al. | 210/773 |
| 4,746,341 | 5/1988 | Komoda | 501/80 |
| 4,808,558 | 2/1989 | Park et al. | 501/88 |
| 4,866,011 | 9/1989 | Hargus et al. | 501/80 |
| 4,885,263 | 12/1989 | Brockmeyer et al. | 501/80 |

FOREIGN PATENT DOCUMENTS

| 61-259870 | 11/1986 | Japan . |
|---|---|---|
| 1483055 | 8/1977 | United Kingdom . |
| 2168338A | 6/1986 | United Kingdom . |

Primary Examiner—Mark L. Bell
Assistant Examiner—Paul Marcantoni
Attorney, Agent, or Firm—Nixon & Vanderhye

[57] ABSTRACT

A ceramic foam filter, particularly for filtering molten iron, is formed from a composition comprising silicon carbide, alumina, silica derived from colloidal silica sol and alumino-silicate fibres, which has been fired at such a temperature that the filter has a ceramic matrix in which the alumino-silicate fibres are substantially dissolved. The filter is fired at a minimum of 1150° C. and preferably within the range from 1200° to 1300° C. Preferably the filter is formed from an aqueous slurry having a solids content comprising by weight 20–50% silicon alumina, 20–50% alumina, 1.5–5.0% silica derived from colloidal silica sol and 1–3% alumino-silicate fibres.

10 Claims, No Drawings

CERAMIC FOAM FILTERS

This is a continuation of application Ser. No. 07/558,154, filed Jul. 26, 1990, now abandoned.

This invention relates to ceramic foam filters, and particularly to ceramic foam filters for the filtration of molten iron.

Ceramic foam filters are commonly used for filtering a variety of molten metals, including aluminium, copper and iron.

The filters which were originally used for this purpose were principally phosphate bonded ceramic foams but due to the use of a phosphate binder, such as aluminium orthophosphate, these filters suffer from disadvantages, particularly when used for filtering iron, because the filters can have insufficient strength for handling when subjected to molten iron casting temperatures unless they are of thick section i.e. of the order of 20 mm or above. Furthermore phosphate binders are undesirable for environmental reasons because at the temperature at which the filters are fired during manufacture they evolve phosphorus pentoxide.

It has now been found that improved filters for molten iron are obtained if the ceramic foam is made from a composition comprising silicon carbide, alumina, colloidal silica sol, and a minor proportion of alumino-silicate fibre.

According to the invention there is provided a ceramic foam filter made from a composition comprising silicon carbide, alumina, silica derived from colloidal silica sol and alumino-silicate fibres and which has been fired at such a temperature that the filter has a ceramic matrix in which the alumino-silicate fibres are substantially dissolved.

The ceramic foam filter is preferably formed from an aqueous slurry having a solids content comprising 20–50% by weight silicon carbide, 20–50% by weight alumina, 1.5–5.0% by weight silica derived from colloidal silica sol and 1–3% by weight alumino-silicate fibres.

The particle size of the silicon carbide is preferably 1 to 80 microns, and the particle size of the alumina is preferably 1 to 40 microns. The alumino-silicate fibres preferably have a length of 60 microns to 3 mm. Colloidal silica sols are commercially available having a silica content in the range of 30–50% by weight. The aqueous slurry used to produce the filter of the invention will therefore usually contain from 5 to 10% by weight colloidal silica sol.

The ceramic foam filter may be made using a known method of making a ceramic foam in which an organic foam usually a polyurethane foam, is impregnated with an aqueous slurry cf ceramic material containing a binder, the impregnated foam is dried to remove water and the dried impregnated foam is fired to burn off the organic foam to produce a ceramic foam. The production of ceramic foams by this method is described in U.S. Pat. No. 3,090,094 and in British Patents 932862, 916784, 1004352, 1054421, 1377691, 1388911, 1388912 and 1388913.

During manufacture the ceramic foam filter of the invention must be fired at a minimum of 1150° C. Preferably the firing temperature is within the range of from 1200° C. to 1300° C.

According therefore to a further feature of the invention there is provided a method of making a ceramic foam filter comprising forming an aqueous slurry containing silicon carbide, alumina, colloidal silica sol, and alumino-silicate fibres, impregnating an organic foam with the slurry, drying the impregnated foam to remove the water and firing the dried impregnated foam at a temperature of at least 1150° C.

When the filter is fired the colloidal silica, the alumino-silicate fibres and the finer particles of alumina interact to form a ceramic matrix surrounding the silicon carbide and the coarser alumina particles and having an aluminium silicate primary binder phase. Substantial dissolution of the alumino-silicate fibres in the ceramic matrix can be demonstrated by microscopic examination of the ceramic foam filter using a Scanning Electron Microscope (SEM).

The slurry may also contain other additives to improve the applicational properties of the slurry during impregnation of the organic foam. Examples of such additives are rheological agents, such as clay, fumed silica or organic thickening agents, coating aids, such as polyvinyl alcohol and antifoaming agents.

If desired the filters of the invention may be further improved by coating them with additional ceramic material of the same composition after drying and prior to firing the impregnated organic foam. When the filters are coated in this way the coating mass will usually constitute 5–10 % by weight of the finished filter.

The filters of the invention are stronger and less friable than phosphate-bonded silicon carbide filters and because they are stronger it is possible to use them as thinner sections i.e. of the order of 15 mm or below.

The following examples will serve to illustrate the invention.

EXAMPLE 1

Ceramic foam filters suitable for the filtration of molten iron were made as follows:

An aqueous slurry of the following composition was prepared:

|  | % By Weight |
|---|---|
| silicon carbide (particle size D50 = 25 microns) | 47.00 |
| aluminia (particle size D50 = 4 microns) | 25.00 |
| alumino-silicate fibres (length 3 mm) | 2.00 |
| clay | 3.00 |
| fumed silica | 2.50 |
| thickening agent | 0.05 |
| polyvinyl alcohol | 3.25 |
| colloidal silica sol (30% by weight silica) | 5.50 |
| antifoaming agent | 0.10 |
| water | 10.60 |

The silicon carbide, alumina, alumino-silicate fibres, clay, fumed silica and thickening agent were mixed together in a powder blender and transferred to a mixer. The polyvinyl alcohol and antifoaming agent were added, and the constituents were mixed. The colloidal silica sol was then added, followed by sufficient water to give a dough-like consistency on further mixing. The balance of the water was finally added and mixing continued to produce a slurry.

Reticulated flexible polyurethane foam pieces measuring 50×50×22 mm and 50×50×15 mm were impregnated with the slurry, and after removal of excess slurry, the impregnated pieces were dried at 180° to 190° C. for 1 hour, and then heated to 1200° C. and fired for 1 hour at that temperature.

The compression strength of the 22 mm thick filters was measured and found to be an average of 2.7 kg/cm². Commercially available phosphate bonded silicon carbide based ceramic foam filters for iron of the same dimensions had an average compression strength of 1.5 kg/cm².

Ten of the 15 mm thick filters were tested to assess their suitability for filtering molten iron by direct impingement of molten grey iron at a temperature of 1400° C. from a height of 500 mm and all the filters passed the test.

In a similar impingement test 9 out of 10 phosphate bonded silicon carbide based ceramic foam filters of the same dimensions failed.

EXAMPLE 2

Ceramic foam filters were produced from reticulated flexible polyurethane foam pieces measuring 50×50×15 mm and from three different aqueous slurries using the method described in Example 1.

The slurries had the following percentage composition by weight:

|  | 1 | 2 | 3 |
|---|---|---|---|
| silicon carbide (particle size D50 = 25 microns) | 30.00 | 30.00 | 30.00 |
| alumina (particle size D50 = 4 microns) | 43.00 | 42.00 | 42.00 |
| alumino-silicate fibres (average length 150 microns) | — | — | 1.00 |
| andalusite | — | 1.00 | — |
| clay | 3.00 | 3.00 | 3.00 |
| fumed silica | 2.00 | 2.00 | 2.00 |
| thickening agent | 0.05 | 0.05 | 0.05 |
| polyvinyl alcohol | 3.00 | 3.00 | 3.00 |
| antifoaming agent | 0.15 | 0.15 | 0.15 |
| colloidal silica sol (30% by weight silica) | 10.00 | 10.00 | 10.00 |
| water | 8.80 | 8.80 | 8.80 |

Filters produced from slurry 1 which contained no alumino-silicate fibres had an average compression strength of 1.44 kg/cm²; filters produced from slurry 2 which contained andalusite, a particulate aluminium silicate, instead of alumino-silicate fibres had an average compression strength of 1.10 kg/cm², and filters containing alumino-silicate fibres according to the invention produced from slurry 3 had an average compression strength of 1.65 kg/cm².

The filters from slurry 3 were 15% stronger than the filters from slurry 1 and 50% stronger than the filters from slurry 2.

I claim:

1. A ceramic foam filter formed by impregnating an organic foam with an aqueous slurry, said slurry composition comprising 20% to less than 50% by weight silicon carbide, 20–50% by weight alumina, 1.5–5.0% by weight silica derived from colloidal silica sol, and 1–3% by weight alumino-silicate fibers, and having been fired at a temperature of at least 1150° C., so that the filter has a ceramic matrix in which substantially all the alumino-silicate fibers are dissolved.

2. A ceramic foam filter according to claim 1 wherein the silicon carbide has a particle size of 1 to 80 microns.

3. A ceramic foam filter according to claim 1 wherein the alumina has a particle size of 1 to 40 microns.

4. A ceramic foam filter according to claim 1 wherein the alumino-silicate fibers have a length of 60 microns to 3 mm.

5. A ceramic foam filter according to claim 1 which has been fired at a temperature within the range of from 1200° C. to 1300° C.

6. A ceramic foam filter according to claim 1 having a thickness of 15 mm or below.

7. A ceramic foam filter according to claim 2 having a thickness of 15 mm or below.

8. A ceramic foam filter according to claim 3 having a thickness of 15 mm or below.

9. A ceramic foam filter according to claim 4 having a thickness of 15 mm or below.

10. A ceramic foam filter according to claim 5 having a thickness of 15 mm or below.

* * * * *